United States Patent [19]

Pechuk et al.

[11] 4,160,377
[45] Jul. 10, 1979

[54] LOAD CELL

[75] Inventors: Vasily I. Pechuk; Vladimir M. Pompeev; Nikolai B. Karikh, all of Kiev, U.S.S.R.

[73] Assignee: Kievsky Institut Avtomatiki Imeni XXV Siezda KPSS, Kiev, U.S.S.R.

[21] Appl. No.: 788,458

[22] Filed: Apr. 18, 1977

[51] Int. Cl.² ............................................. G01L 1/22
[52] U.S. Cl. ..................................... 73/141 A; 338/5
[58] Field of Search .......................... 73/141 A; 338/5

[56] References Cited

U.S. PATENT DOCUMENTS 3,757,573 9/1973 Pechuk et al. .................... 73/141 A

FOREIGN PATENT DOCUMENTS 424025 9/1974 U.S.S.R. ................................. 73/141 A

Primary Examiner—Charles A. Ruehl
Attorney, Agent, or Firm—J. Harold Nissen

[57] ABSTRACT

A load cell has a circular structure comprising a resilient element and a hollow housing with a projection on the internal surfaces of the walls thereof. The resilient element is accommodated in the housing on a plurality of balls supported by the projection of the housing and has on one side thereof a lug adapted to take up the load being measured, and on the other side thereof props with strain gauges. The load cell is characterized in that it incorporates strain gauges which are not adhesive-bound, including wire of which the electric resistance varies in accordance with the strain applied to the wire, the wire being mounted on the props made integral with the solid resilient element, so that the wire follows a sinuous path, with the wire being arranged either continuously or between groups of the props.

9 Claims, 4 Drawing Figures

LOAD CELL

The invention relates to load cells, and, more particularly, it relates to load cells capable of measuring compression forces and suitable for measuring the weight of a load suspended from the hook of a crane or other hoisting device, the load under the nut of the pressure screw of the roll cage of a rolling mill, as well as for other applications.

It is known in the art to provide load cells which are used for measuring loads applied to the rolls of rolling mills. It is also known in the art to provide load cells to convert a load into a proportional deformation, and these load cells include solid rings having a deformation-responsive area and a load-responsive projection or lug. The deformation-responsive area in these load cells of the prior art has adhesive-bound thereto strain gauges adapted to convert the deformation of the ring into an output electric signal corresponding to the value of the load. One of such load cells of the prior art is disclosed in the U.S. Pat. No. 3,520,182.

A serious disadvantage of these load cells of the prior art is the dependence of their output signal upon the accuracy of the positioning of the cell, upon slanting of the latter, upon off-centre application of the load, upon the load being applied not over the entire load-engaging area. The major cause of this disadvantage is the non-permanent and non-uniform distribution of the strain across the section of the ring, and, hence, different readings of the adhesive-bound strain gauges, dependent as they are on the local values of the deformation.

The error can be somewhat reduced by thorough finishing of the engagement surfaces. This technique doubtlessly proves effective at the early stage of the service life of the load cell; however, in the course of this service life the engagement surfaces are acted upon by aggressive fluids and adverse conditions, such as high temperatures, the presence of steam, etc., so that the high finish of these surfaces would not practically be maintained for longer periods. On the other hand, even with the most thorough machining and finish of the engagement surfaces, the non-uniformity of an effort transmitted through a threaded couple (i.e. the nut/pressure screw couple) can be as high as 15 to 20 percent.

Therefore, the major disadvantage of the aforementioned load cells of the prior art is caused by the fact that the adhesive-bound strain gauges incorporated therein respond to local deformations which are not directly and unwaveringly related to the load applied to the load cell and are liable to vary in time under the influence of the abovementioned factors.

There is also known a load cell disclosed in the U.S. Pat. No. 3,757,573, comprising a circular hollow housing with a projection made on the internal surfaces of the walls thereof and a resilient element supported in the housing on a plurality of balls resting on this projection of the housing, the resilient element having on one side thereof a lug adapted to take up the load and on the other side thereof props with resistance strain gauges drawn therebetween. The resilient element of this load cell is made in the form of a body of rotation with a hemispherical lug adapted to take up the load, and the base is made in the form of a flat disc having props arranged along the periphery thereof and making up a circle. The resistance strain wire is helically wound about these props. With the load cell being loaded, the resilient element is deflected, thereby causing the props to move apart, and the resistance strain gauge to extend.

Although the last-described load cell of the prior art complies with the requirement of high response and is capable of taking up a wide range of loads, the field of applications thereof is limited by such cases where disc-type load cells can be used, i.e. by cases where the point of application of the load belongs to the axis of the load cell.

It is the main object of the present invention to provide a load cell of the abovedescribed type, which should be of a structure eliminating the factors affecting the accuracy of the readings.

It is another object of the present invention to provide a load cell wherein non-uniformity of the application of the load should not affect the accuracy of the readings.

It is a further object of the present invention to provide a load cell, wherein the structure of the strain gauge elements should provide for integrated response to deformation.

It is still another object of the present invention to provide a load cell, which should be unaffected by the influence of the environment.

It is also an object of the present invention to provide a load cell for measuring various loads, wherein the influence of friction between the supporting surfaces should be minimized.

With these and other objects in view, the present invention resides in a load cell wherein the props are arranged along concentric circles, the resistance strain gauges being mounted therebetween substantially radially.

The herein disclosed structure of a load cell ensures independence of the readings of the resistance strain gauges from local deformations, as well as the stability of the dimensions of the resilient element defining its deformation properties, and independence of this deformation from the end-face friction.

To provide for integrated response to deformation, it is expedient that the resistance strain gauges should include a continuous wire running about the props in a sinuous pattern.

The herein disclosed inventive idea can be embodied in both disc-type and annular load cells.

With a load cell embodying the invention being of a disc type, the resilient element thereof is preferably made in the form of a body of rotation with a hemispherical lug adapted to take up the load, arranged centrally of the resilient element, to provide for uniform distribution of the deformation.

With a load cell embodying the present invention being of an annular design, e.g. for measuring the load under the nut of the pressure screw of the roll cage of a rolling mill, the resilient element is preferably made in the form of an annulus with a circumferential lug adapted to take up the load, the edge surfaces of the annulus bearing upon balls supported by complementary projections provided on the internal surfaces of the walls of the housing, the latter being in this case also shaped as an annulus trough-shaped in cross-section.

Since in annuli subjected to a compression load in an axial direction the deformation increases in a direction off the periphery of the annulus, the lug adapted to take up the load is preferably offset toward the periphery of the ring from the axis of symmetry of the radial section of the resilient element, so that the unequality of the arms thus produced should be proportional to the unequality of the respective rigidity values of the external and internal contours of the resilient element. This feature eliminates an error in the readings of the load cell, caused by non-uniformity of the distribution of the deformation in the resilient element in a radial direction, upon the resilient element being deflected.

These and other objects of the present invention will become apparent from the following description of embodiments thereof, with reference being had to the accompanying drawings wherein like numerals are used to indicate like positions.

Figure 1:
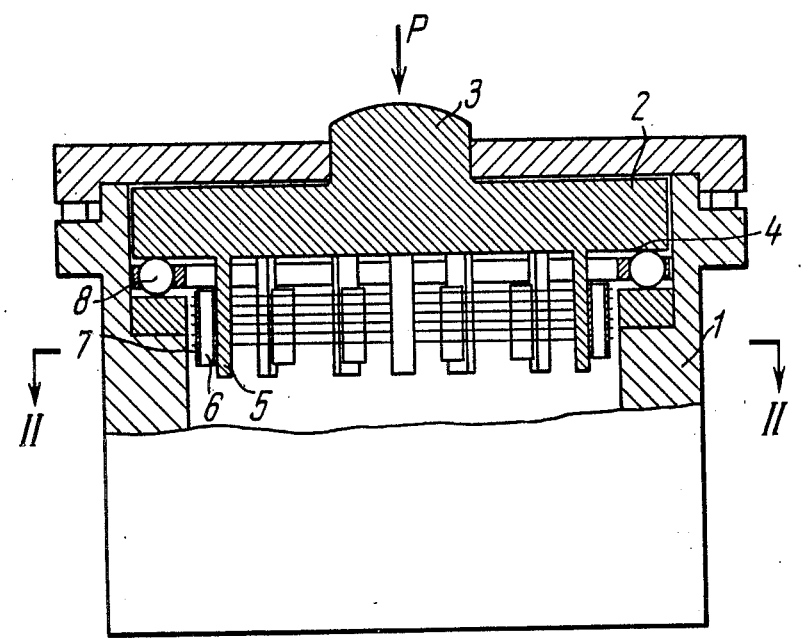
FIG. 1 is a cross-sectional view of a load cell embodying the present invention.
Figure 2:
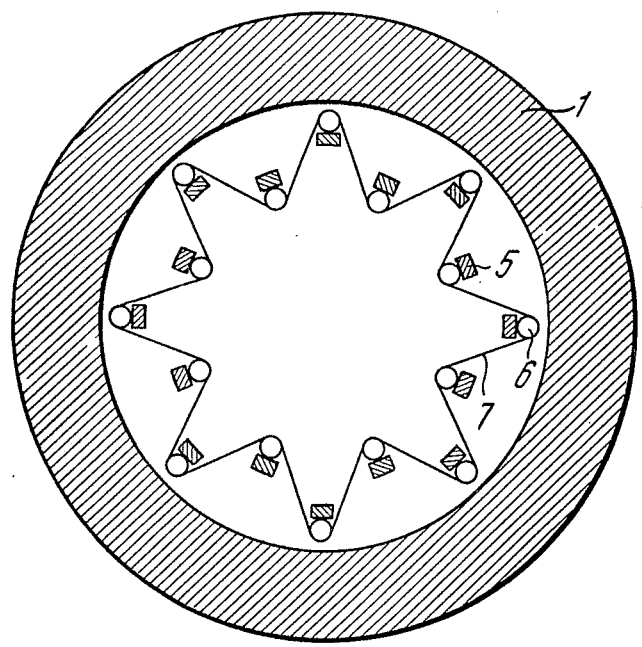
FIG. 2 is a sectional view of the load cell, taken on line II—II of FIG. 1.

Referring now in particular to the appended drawings, the load cell illustrated in FIG. 1 includes a circular hollow housing 1 accommodating therein a resilient element 2 shaped in this embodiment as a solid body of rotation with a hemispherical lug 3 on one side thereof, adapted to take up the load being measured, the other side of the element 2 being a surface 4 shaped as a circle with props 5 (FIGS. 1 and 2) spaced from one another and arranged along two concentric circles, the props carrying insulators 6 supporting thereon resistance strain gauges 7. The bearing or support surface of the resilient element 2 bears upon a plurality of balls 8 supported, in their turn, by an annular internal projection of the housing 1. The resistance strain gauges 7 are arranged with respect of the props 5 so that they run about the successive props 5 in a sinuous or serpentine fashion, i.e. the strain-responsive resistance wire runs in alternation about the props belonging to the external circle and those belonging to the internal one. Therefore, the spans of the resistance strain wire between successive pairs of adjacent props 5 are directed substantially radially (FIG. 2).

Figure 3:
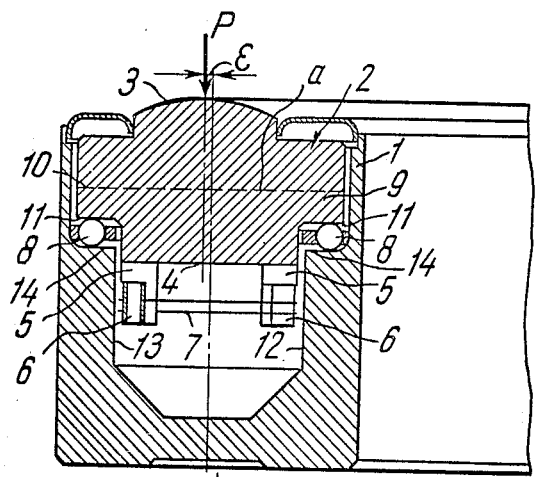
FIG. 3 is a radial sectional view of a load cell constructed in accordance with another embodiment of the present invention.

As it can be seen in FIG. 3, a load cell constructed in accordance with another embodiment of the present invention has an annular resilient element 2 made integral with an annular lug 3 adapted to take up the load, and the back side or base defining an annular surface 4. The resilient element 2 further has two annular shoulders of flanges to both sides of the lug 3 adapted to take up the load, viz. an internal radial flange 9 and an external radial flange 10, both flanges having annular bearing surfaces 11 on the respective undersides thereof.

The surface 4 has thereon spaced props 5 made integral with the resilient element 2. The props 5 with the insulators 6 (FIGS. 3 and 4) carried thereby are arranged in two concentric arrays of spaced supports for the resistance strain gauges. In the presently described embodiment, the resistance strain gauge is in the form of a Constantan wire, however, those competent in the art should be well aware of the fact that other materials having their electric resistance characteristics dependent on the strain applied thereto can be used for the purpose.

The lug 3 adapted to take up the load, in order to provide for uniform deformation of the resilient element 2 under the load applied thereto, is asymmetrical with respect of the vertical axis of the cross-section of the resilient element 2 by a value $\epsilon$, as it can be seen in FIG. 3, the inequality of the arms produced in this manner being proportional to the inequality of the values of the rigidity of the external and internal contours of the radial cross-section of the resilient element 2.

In the presently described embodiment of the invention, the load cell further has an annular housing 1 trough-shaped in cross-section, having an internal vertical wall 12 and an external radial wall 13. The two walls have annular projections 14 spaced from the respective bearing surfaces of the internal flange 9 and of the external flange 10, in oposition thereto. Interposed between these edge or bearing surfaces 11 of the flanges 9 and 10 and the respective projections 14 there are respective pluralities of balls 8 acting as the bearing means for the resilient element 2 and providing for a rolling contact between the respective surfaces and projections.

Owing to the trough-like cross-sectional shape of the housing 1, the props 5 with the resistance strain wire and the bearing surfaces of the resilient element 2 and of the housing 1 can be insulated from the ambient atmosphere, for which purpose any suitable known per se gaskets can be applied over possible gaps. The sealing attachment of such gaskets can be ensured by any suitable known technique, e.g. by welding or soldering.

As it can be seen in FIG. 3, the bearing or edge surfaces 11 of the resilient element 2 are situated between the central plane (the neutral plane) indicated in FIG. 3 with a dash line, and the bottom surface 4, which enables to eliminate the influence of friction upon the readings of the load cell, since the displacement of the resilient element 2 relative to the bearing points 8, as the element deflects in this plane, is minimal.

Figure 4:
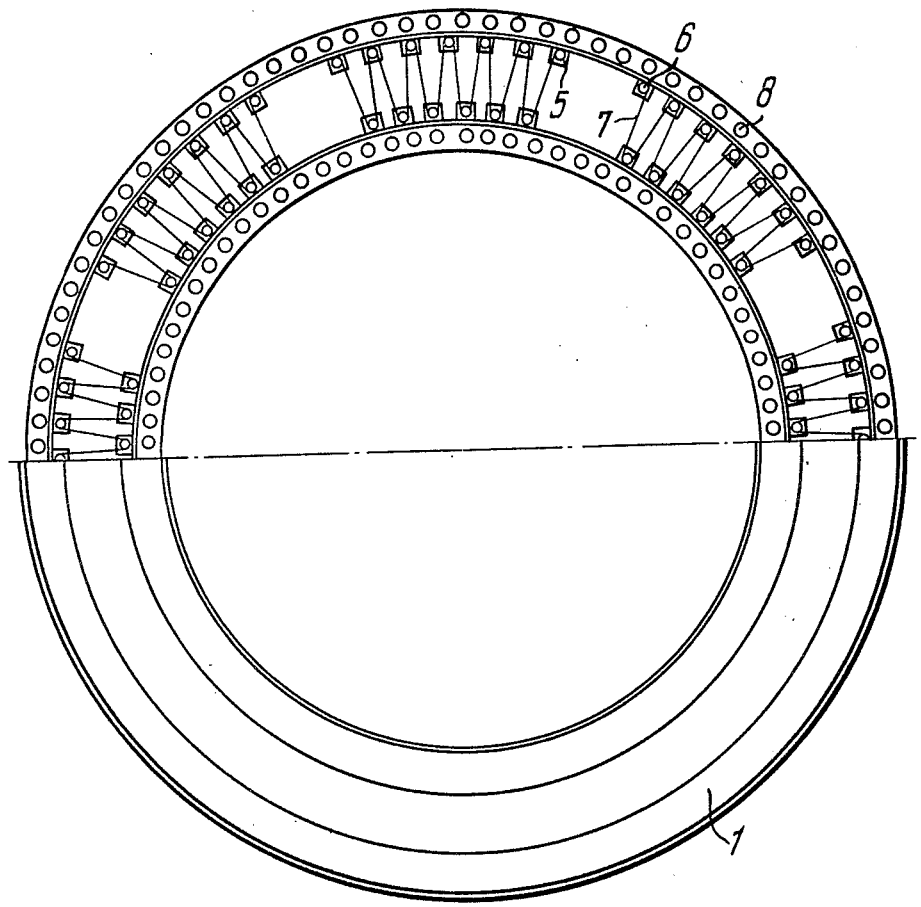
FIG. 4 is a view taken along arrow line "A" at the load cell illustrated in FIG. 3, with a part of the housing removed to show the strain gauges.

Shown in FIG. 4 is the load cell in accordance with the presently described embodiment of the present invention, as viewed from the side opposite to the lug 3 adapted to take up the load, the drawing also showing several sectors of the resistance strain gauges 7, uniformly spaced along the entire circumferential extent of the resilient element 2.

In the presently described embodiment of the load cell the props 5 are arranged intermediate the bearing surfaces 11 of the resilient element 2 along arcs belonging to two concentric circles, a resistance strain wire being drawn in each sector, successively running about the external and internal supports or props 5 in alternation, in a sinuous or serpentine pattern. It is quite obvious for a person skilled in the art that, depending on the actual design, the dimensions of the sectors can be different, with the corresponding length of the resistance strain wire incorporated in each sector; alternatively, the wire can be continuous throughout the circumferential extent of the resilient element.

When the load cell is loaded, the load applied to the lug 3 adapted to take up the load yields uniform distribution of strain throughout the mass of the resilient element 2 and corresponding degrees of deformation, with the resilient element being deflected in the direction of the action of the load P and the props 5 moving apart; i.e. the spacing between the external and internal props increases, and the electric resistance of the wire of the resistance strain gauges varies accordingly.

The herein disclosed load cell is of such a structure that the action of a compression load thereupon is converted therein into a deformation of deflection, with the linearity of the response and integrated reaction to the load ensured, the influence of friction between the bearing surfaces and that of hysteresis-type characteristics of the load cell having been reduced to a value that can be considered negligible.

It should be understood that the invention as it has been illustrated and described hereinabove is to be considered as merely a preferable embodiment thereof, and that various modifications and changes concerning the shape, size and disposition of the components can be introduced without departing from the spirit and scope of the invention, as defined in the claims to follow.

What is claimed is:

1. A load cell comprising:
   a housing having internal projections;
   a resilient element accommodated within said housing having a lug on one side thereof to take up the load and a back side spaced from said projections in opposition thereto, a group of spaced props on said back side of said resilient element arranged along concentric circles;
   a plurality of balls interposed between said projections and said back side, whereby rolling contact is established therebetween; and,
   a resistance strain gauge drawn between said props and extending substantially radially of said circles.

2. A load cell as set forth in claim 1, wherein the resistance strain gauge runs about the props in a sinuous pattern.

3. A load cell as set forth in claim 1, wherein said resilient element is shaped as a body of rotation and said lug is spherically rounded, the point of application of the load being along the central axis of the resilient element.

4. A load cell as set forth in claim 1, wherein said resilient element is shaped as an annulus, the housing being a trough-shaped annulus with the projections on the internal surfaces of the walls thereof, the resilient element having its edge surfaces resting on said balls and supported by the projections of the housing.

5. A load cell as set forth in claim 4, wherein the lug adapted to take up the load is offset with respect of the axis of symmetry of the radial cross-section of the resilient element so that the inequality of the arms thus formed is proportional to the inequality of the values of rigidity, respectively, of the internal and external contours of the resilient element.

6. A load cell as set forth in claim 5, wherein the edge surfaces of the resilient element belong to a plane situated intermediate the neutral plane of the resilient element and the back side thereof.

7. A load cell as set forth in claim 1, wherein said resistance strain gauge includes a continuous wire running about said props.

8. A load cell as set forth in claim 1, wherein said resistance strain gauge includes a continuous wire running about said props in a sinuous pattern.

9. A load cell as set forth in claim 1, wherein said resistance strain gauge includes a wire mounted between successive pairs of adjacent props, said adjacent props being offset from each other with one of said adjacent props being in one of said concentric circles and the other of said adjacent props being in the other of said concentric circles.

* * * * *